United States Patent [19]

Amakawa et al.

[11] Patent Number: 4,615,955

[45] Date of Patent: Oct. 7, 1986

[54] FUEL CELL

[75] Inventors: Koji Amakawa; Norihira Uozumi, both of Hitachi, Japan

[73] Assignee: Hitachi, Ltd., Tokyo, Japan

[21] Appl. No.: 757,450

[22] Filed: Jul. 22, 1985

[30] Foreign Application Priority Data

Jul. 23, 1984 [JP] Japan .................. 59-151242

[51] Int. Cl.$^4$ ........................... H01M 2/00
[52] U.S. Cl. ...................... 429/34; 429/41; 429/46
[58] Field of Search .................. 429/34–44, 429/46

[56] References Cited

U.S. PATENT DOCUMENTS 4,115,627  9/1978  Christner et al. .......... 429/44
4,125,676 11/1978  Maricle et al. ........... 429/38
4,129,685 12/1978  Damiano ................ 429/44 X
4,365,007 12/1982  Maru et al. ............. 429/34 X
4,476,199 10/1984  Takeuchi et al. .......... 429/34
4,515,871  5/1985  Shirogami et al. ......... 429/34

Primary Examiner—Charles F. Lefevour
Attorney, Agent, or Firm—Antonelli, Terry & Wands

[57] ABSTRACT

A fuel cell for generating electricity by reaction of reacting gases through a catalyst, which comprises a pair of electrodes each having a gas passage and being made from a porous substrate, an electrolyte-retaining matrix provided between the electrodes, and a pair of separator plates for partitioning the cells at the outer ends, one electrode in which a gas is formed by reaction of the reacting gases, among the pair of electrodes, having a catalyst layer and an independent gas inflow passage and an independent gas outflow passage as the gas passage and the reacting gas supplied from the gas inflow passage being passed through the electrode and the catalyst layer to the gas outflow passage as accompanied with the gas formed by the reaction of the reacting gas through the catalyst layer has a good diffusion of a reacting substance through the electrode and an improved electrode performance.

18 Claims, 11 Drawing Figures

THE INVENTION

FIG. 5
THE INVENTION

FIG. 6
THE INVENTION

FIG. 7
THE INVENTION

FIG. 8
THE INVENTION

FIG. 9
THE INVENTION

FIG. 10
THE INVENTION

FIG. 11 or accompanied with

FUEL CELL

BACKGROUND OF THE INVENTION

This invention relates to an improvement of a fuel cell.

Figure 1:
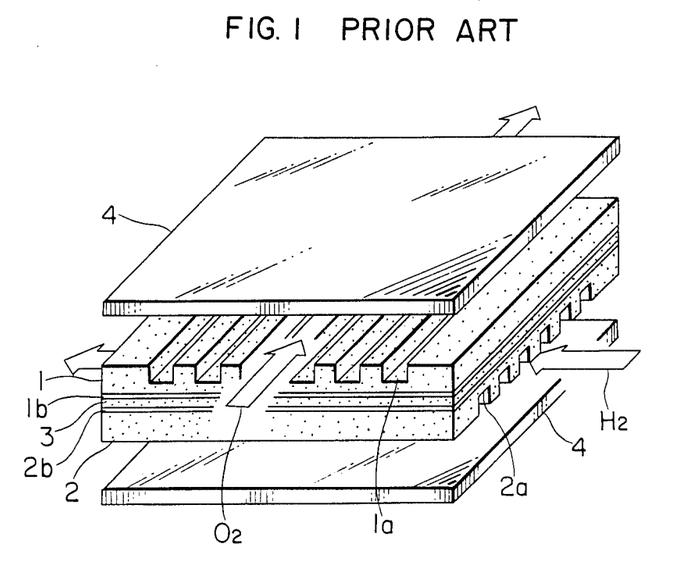
FIG. 1 is a schematic perspective view of a conventional fuel cell.

A fuel cell so far usually used, for example, an acid electrolyte-type fuel cell comprises a pair of electrodes, i.e. an oxygen electrode 1 and a hydrogen electrode 2, and an electrolyte-containing matrix 3 provided between the electrodes, as shown in FIG. 1 (U.S. Pat. No. 4,115,627). In a practical application, a plurality of the unit cells of such structure are stacked one upon another through separator plates 4 in view of the desired output voltage.

The oxygen electrode 1 and the hydrogen electrode 2 are made from porous substrates, and gas channels, that is, an oxygen channel 1a and a hydrogen channels 2a, are provided on the respective electrode surfaces, particularly on the electrode surfaces that do not face the matrix 3, whereas catalyst layers 1b and 2b made from a porous material are provided on the respective electrode surfaces that face the matrix 3.

The fuel cell of such a structure as described above is operated by supplying oxygen molecules $O_2$, for example, in the form of air, as an oxidizing agent to the oxygen channel 1a on the oxygen electrode and hydrogen molecules $H_2$ as a fuel gas to the hydrogen channel 2a on the hydrogen electrode, and conducting their reaction through the catalyst layers, thereby generating electricity.

In this case, there would be no particular problem, so long as these gases such as hydrogen molecules and oxygen molecules thoroughly contact the catalysts to undergo the reaction, but the reaction has not be carried out satisfactorily on the following grounds, and consequently satisfactory performance of the fuel cell, particularly satisfactory electrode performance, has not been fully obtained.

Figure 2:
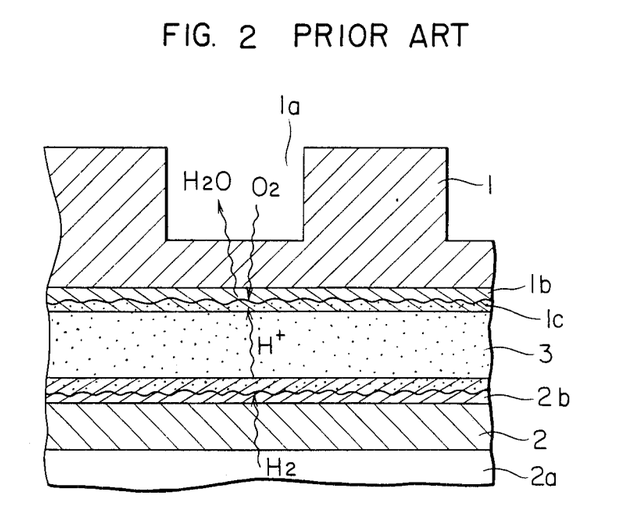
FIG. 2 is a vertical cross-sectional, enlarged view of the essential part of the conventional fuel cell of FIG. 1.

That is, as shown in FIG. 2, where the essential parts of the fuel cell of FIG. 1 is schematically given as enlarged, a portion of hydrogen molecules $H_2$ passing through the hydrogen channel 2a are diffused through the hydrogen electrode 2 and are ionized into hydrogen ions $H^+$ through the catalyst layer 2b. The hydrogen ions migrate through the electrolyte-containing matrix 3 and reach the catalyst layer 1b. On the other hand, a portion of oxygen molecules $O_2$ passing through the oxygen channel 1a diffuse through the oxygen electrode 1 and the catalyst layer 1b. At a catalyst 1c, which is wet with the electrolyte in the catalyst layer 1b, the diffused oxygen molecules and the migrated hydrogen ions undergo reaction, whereby water is generated. The thus formed water molecules $H_2O$ in the form of water vapor diffuse through the catalyst layer 1b and the oxygen electrode 1 in the direction opposite to the diffusing direction of oxygen molecules $O_2$, that is, in a counter-current direction thereto, and reaches the oxygen channel 1a. The water vapor joins into the remaining portion of the undiffused oxygen and is discharged to the outside of the fuel cell. In this manner, the oxygen molecules $O_2$ and the water vapor $H_2O$ diffuse in the counter-current direction to each other through the oxygen electrode 1 of the fuel cell of such a structure as described above, and thus the diffusion of water vapor impedes the diffusion of oxygen molecules.

Figure 3:
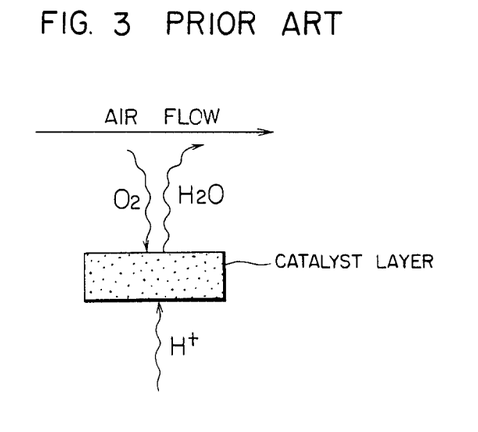
FIG. 3 is a schematic view of the gas flow at the oxygen electrode of the conventional fuel cell.

The flow of gases through the oxygen electrode of the conventional acid electrolyte-type fuel cell is schematically shown in FIG. 3. That is, oxygen molecules reach the catalyst layer by diffusion and react with hydrogen ions. The thus formed water as vapor reaches the flow of oxygen, for example, in the form of air, by diffusion and is carried away thereby. Oxygen molecules and water vapor diffuse in a counter-current direction to each other, and act as resistances to their diffusion each other.

Figure 4:
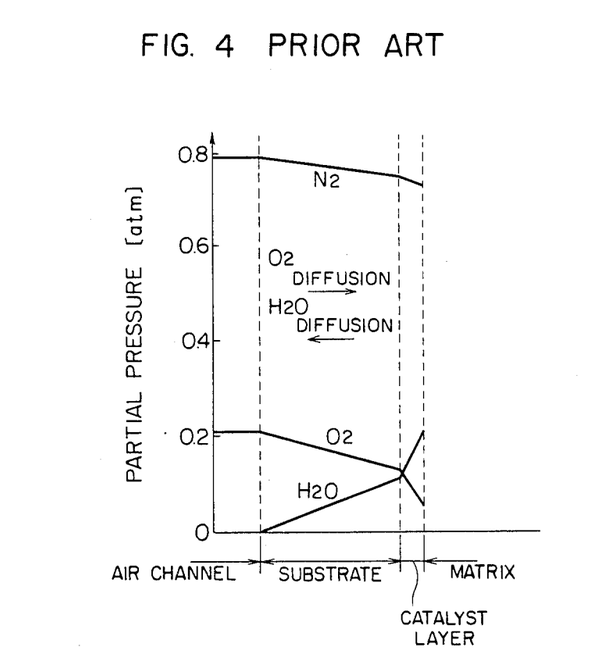
FIG. 4 is a diagram showing the gas partial pressure distribution against the position in the conventional fuel cell.

The relationship between the position of cell members and the partial pressures of water vapor and oxygen at the oxygen electrode is shown in FIG. 4, where the distribution of gas partial pressure in the oxygen electrode (air electrode) of a phosphoric acid fuel cell is shown at a current density of 500 $mA/cm^2$. Partial pressure of oxygen is lowered to about 0.1 atm on average in the catalyst layer. A low partial pressure of oxygen at the reaction sites in the catalyst layer means a low electrode performance, and also an adverse effect on the performance of the fuel cell.

A carbon pore fuel cell, to which an oxidizing gas is supplied through a porous carbon plate without especially providing a gas channel, is disclosed in U.S. Pat. Nos. 4,125,676 and 4,129,685, but the oxidizing gas does not pass through the catalyst layer.

SUMMARY OF THE INVENTION

An object of the present invention is to provide a fuel cell with a good diffusion of a reacting substance through an electrode and an improved electrode performance.

According to the present invention, a catalyst is made present in the electrode in which a gas is formed by the reaction of a reacting substance, a passage for the reacting substance to the electrode comprises an independent inflow passage and an independent outflow passage, and the reacting substance supplied from the inflow passage is made to pass into the outflow passage through the electrode containing the catalyst. More specifically, according to the present invention, a reacting gas, for example, an oxidizing gas, flows into the electrode in which a gas is formed by the reaction of the reacting gas with the other reacting substance while contacting a catalyst present in the electrode to undergo reaction, and is discharged from the electrode together with the gas formed by the reaction in the cocurrent direction. The reacting gas passes through the electrode from the inflow passage to the outflow passage. The passage for the reacting gas can take a form of grooves, channels, holes or continued pores, and is not restricted to grooves or channels, and the reacting gas must contact the catalyst during diffusion from the inflow end to the outflow end of the electrode and pass through the electrode.

That is, the present invention is to provide a fuel cell for generating electricity by the reaction of reacting gases through a catalyst, which comprises a pair of electrodes each having a gas passage and being made from a porous substrate, an electrolyte-retaining matrix provided between the electrodes, and a pair of separator plates for partitioning the cells at the outer ends, one electrode in which a gas is formed by the reaction of the reacting gas, among the pair of electrodes, having a catalyst layer and an independent gas inflow passage and an independent gas outflow passage as the gas passage, and the reacting gas supplied from the gas inflow passage being through the electrode and the catalyst layer to the gas outflow passage as accompanied with the gas formed by the reaction through the catalyst layer.

PREFERRED EMBODIMENTS OF THE INVENTION

The present invention will be described in detail, referring to embodiments shown in the drawings.

Figure 5:
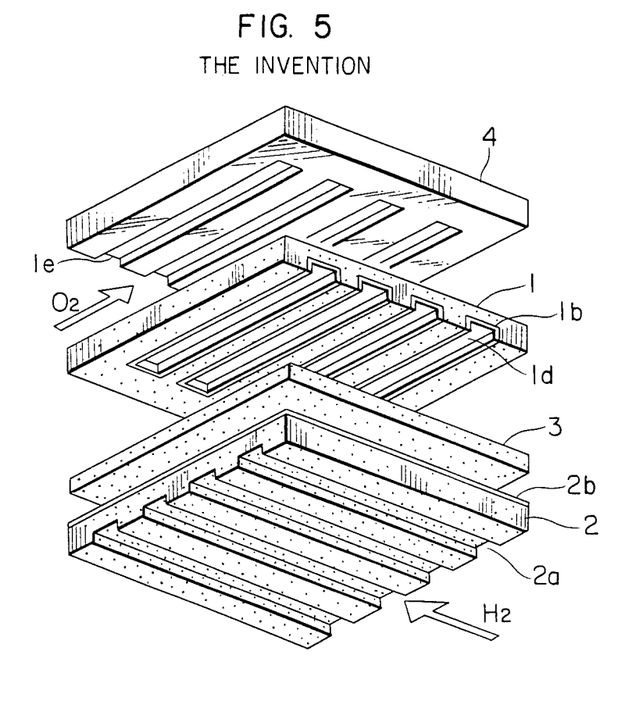
FIG. 5 is a schematic perspective view of one embodiment of a fuel cell according to the present invention.
Figure 6:
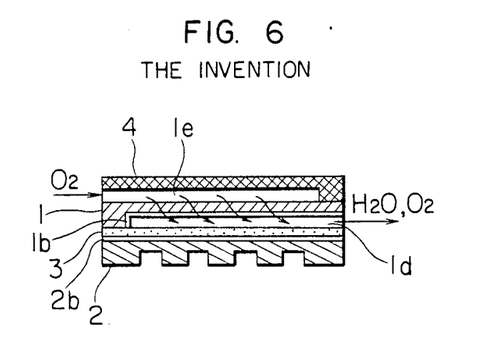
FIG. 6 is a vertical cross-sectional view of the present fuel cell of FIG. 5.

FIGS. 5 and 6 show a part of an acid electrolyte-type fuel cell comprising an oxygen electrode 1, a hydrogen electrode 2, a matrix 3 and a separator plate 4.

The hydrogen electrode 2 is made from a porous carbon fiber substrate as used so far, and a catalyst layer 2b is provided at one side, more particularly, at the side which faces a matrix 3, and a hydrogen passage 2a in the form of channels is provided at the other side. The catalyst layer 2b is formed, for example, by supporting a platinum catalyst on acetylene blacks particles, mixing the catalyst-supporting particles with polytetrafluoroethylene dispersion to make paste, and coating the porous substrate with the paste, followed by sintering.

The matrix 3 is made mainly from SiC containing zirconium phosphate, and impregnated with phosphoric acid as an electrolyte.

The oxygen electrode 1 is made from a porous carbon fiber substrate as in the case of the hydrogen electrode, and has an outflow passage 1d in the form of channels at the side that faces the matrix 3. The outflow passage is open to the outside at one end, while closed to the outside at the other end. The oxygen electrode 1 is wetted with a sufficient amount of the electrolyte. The outflow passage is provided with a catalyst layer 1b on the inside surface, and the catalyst layer 1b is formed in the same manner as in the case of the catalyst layer for the hydrogen electrode.

The separator plate 4 is made from a graphite plate and is provided as adjacent to the oxygen electrode 1 and has an inflow passage 1e in the form of channels at the side that faces the oxygen electrode 1. The inflow passage 1e is provided in the same direction as that of the outflow passage 1d of the oxygen electrode 1 and has an open end and a closed end at the opposite sides to those of the outflow passage.

The side ends of the oxygen electrode 1 and the hydrogen electrode 2 are sealed by resin impregnation, or bonding graphite plates thereto.

The fuel cell of such a structure as described above works as follows. Oxygen molecules $O_2$, for example, those supplied in the form of air, as an oxidizing agent are introduced into the oxygen electrode 1 from the inflow passage 1e and reacts through the catalyst 1b with hydrogen ions supplied to the electrolyte in the oxygen electrode 1 to form water, and are discharged into the outflow passage 1d, accompanied with the product water in the form of water vapor. The catalyst layer 1b may be a single layer or a plurality of layers, or catalyst may be uniformly distributed throughout the porous electrode substrate. The catalyst can be uniformly distributed throughout the porous electrode substrate, without providing a discrete catalyst layer, by mixing supports for the catalyst in a step for preparing a porous electrode substrate from carbon fibers by the paper making method, thereby preparing a substrate containing the supports as distributed uniformly throughout the substrate, and then putting a catalyst on the supports.

Figure 7:
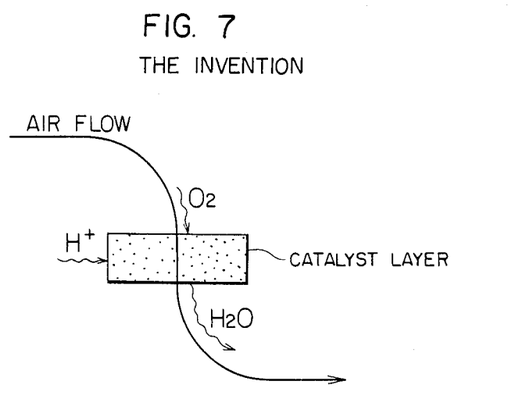
FIG. 7 is a schematic view of the gas flow at the oxygen electrode of the present fuel cell.

The gas flow at the oxygen electrode (air electrode) in the present acid electrolyte-type fuel cell is schematically shown in FIG. 7, where air passes through the catalyst layer, and oxygen molecules in the air reach the catalyst layer and undergo reaction with the hydrogen ions, and the resulting water vapor is carried away with the air. Since the air, i.e. oxygen molecules, and the resulting water vapor migrate in the same direction, the migration of the outgoing water vapor will not be a resistance to the migration of incoming oxygen molecules.

Figure 8:
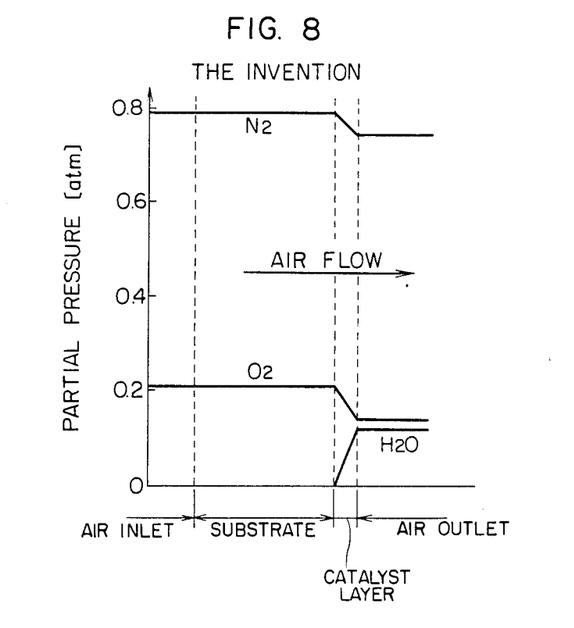
FIG. 8 is a diagram showing the gas partial pressure distribution against the position in the present fuel cell.

FIG. 8 shows the gas partial pressure distribution against the position at the present oxygen electrode (air electrode), where the distribution depends substantially on an oxygen utilization and not substantially on a current density. According to the calculation, the diagram shows the case of 30% oxygen utilization. The oxygen partial pressure at the catalyst layer is about 0.18 atm on average. In this case, the oxygen molecules in the air react with the hydrogen ions while the oxygen molecules pass through the oxygen electrode, and a portion of the oxygen molecules is converted to water vapor, with the result that the oxygen partial pressure is lower towards the gas outlet of the oxygen electrode. However, the resulting water vapor flows in the cocurrent direction with the oxygen molecule flow, and not in the countercurrent direction as in the conventional fuel cell, and thus the oxygen partial pressure is never lowered at the upstream side. Thus, the oxygen partial pressure can be kept higher at the reaction sites, and the electrode can correspondingly maintain a higher performance.

In the foregoing description, one embodiment of gas passage for the oxygen electrode has been explained, and other embodiments of the gas passage will be explained below.

Figure 9:
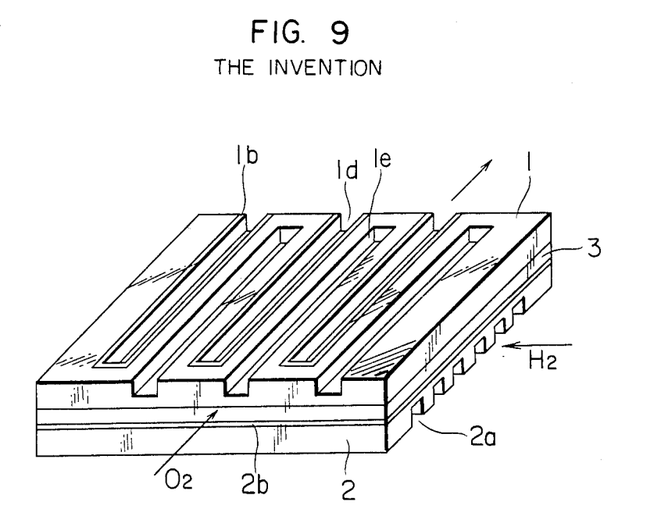
FIG. 9 is a perspective view of another embodiment of a fuel cell according to the present invention.
Figure 10:
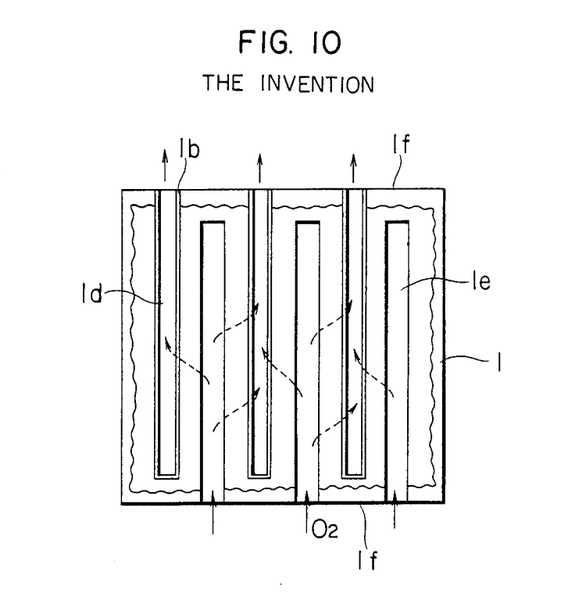
FIG. 10 is a plan view of the present fuel cell of FIG. 9.

FIGS. 9 and 10 show another embodiment of the present fuel cell, where an oxygen electrode 1 has a plurality of inflow passages 1e and outflow passages 1d, which are shorter than the electrode length and are arranged on the same side alternately so as to have openings alternately at the opposite ends of the electrode. The oxygen electrode 1 is made for the same porous substrate as that of FIG. 5 and has a catalyst layer 1b on the inside surfaces of the outflow passages 1d, and the porous substrate is wetted with a sufficient amount of the electrolyte. In this case, the end sides 1b of the electrode are made gas-tight to ensure non-gas diffusion at the sides having no opening of the passages. The hydrogen electrode is formed in the same manner as in the case of the conventional fuel cell. The oxidizing agent such as air is introduced into the oxygen electrode from the inflow passage 1e open to the inlet for the oxidizing agent of the oxygen electrode 1, passes through the catalyst 1b of the oxygen electrode and is discharged in the adjacent outflow passages 1d open to the outlet for the oxidizing agent. When the oxidizing agent passes through the catalyst layer 1b of the oxygen electrode 1, the oxidizing agent reacts with hydrogen ions supplied from the matrix 3 into the electrolyte in the oxygen electrode 1 to form water. In this embodiment, the catalyst layer 1b is provided only on the inside surfaces of the outflow passages 1d, but can be also provided on the inside surfaces of the inflow passages 1e, or can be uniformly distributed in the porous oxygen electrode substrate.

With this structure, it is not necessary to provide an inflow passage for oxygen on the separator plate as in the embodiment shown in FIG. 5, and thus the separator plate can be made thinner, and consequently the thickness of a fuel cell stack can be made smaller.

In the foregoing description, the inflow passages and the outflow passages are provided alternately on one side of the oxygen electrode, but can be provided on both sides, respectively, or the inflow passage and the outflow passage may be reversed to each other in the embodiment of FIG. 5. The inflow passage and the outflow passage can be provided with various modification.

Figure 11:
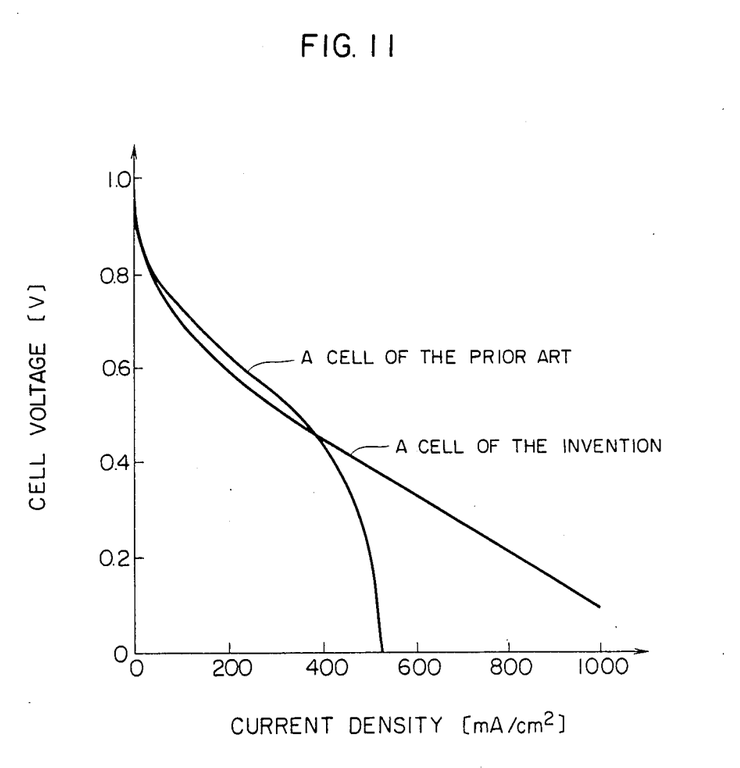
FIG. 11 is a diagram showing current density-voltage characteristics of the conventional fuel cell of FIG. 1 and the present fuel cell of FIG. 5.

The current density-voltage characteristics of the conventional fuel cell of FIG. 1 and the embodiment of the present invention of FIG. 5 are shown in FIG. 11. The embodiment of the present invention has a longer migration distance of hydrogen ions through the electrolyte than that of the conventional fuel cell, and thus has a larger resistance polarization, and consequently has a little poorer performance in the region of lower current density, as compared with that of the conventional fuel cell, but the performance of the conventional fuel cell is rapidly lowered in the region of higher current density owing to an increase in the concentration polarization, whereas in the embodiment of the present invention, the concentration polarization can be kept low owing to the effect of the present invention and electricity can be generated with a higher power even in the region of higher current density. The migration resistance of hydrogen ions through the electrolyte can be improved by improvement of matrix, optimization of electrode dimension, etc.

In the foregoing embodiments, description has been made of an acid electrolyte-type fuel cell where water vapor is generated at the electrode for the oxidizing agent, i.e. the oxygen electrode (air electrode), but in the case of an alkaline electrolyte-type hydrogen-oxygen fuel cell, where water vapor is generated at the hydrogen electrode, it is needless to say that said passages must be provided on the hydrogen electrode.

In the present fuel cell, a catalyst is made present in the electrode in which a gas is formed by the reaction, and the passage for the electrode is constituted from an independent inflow passage and an independent outflow passage, so that the reacting gas supplied from the inflow passage is made to pass through the electrode and contact the catalyst contained therein, and is discharged into the outflow passage. Thus, the reacting gas and the water vapor formed by the reaction can flow in the cocurrent direction, and the diffusion of the reacting gas can be improved and the electrode performance can be increased thereby.

Generally, to make up for the electrolyte loss when a fuel cell is operated for a long time or absorb a change in electrolyte volume due to changes in operating conditions, the electrolyte is made to be reserved in the electrode substrate. When the electrolyte is much reserved in the electrode substrate, most of the pores in the electrode substrate are filled with the electrolyte, and in the case of the conventional fuel cell based on the supply of the reacting gas to the catalyst by natural diffusion, the concentration polarization becomes larger, and the electrode performance is inevitably lowered. In the present invention, on the other hand, the reacting gas is supplied to the catalyst by forced diffusion, and thus the electrode performance can be maintained at a high level even in such a case.

What is claimed is:

1. A fuel cell for generating electricity by reaction of reacting gases through a catalyst, which comprises a pair of electrodes, each having a gas passage formed thereby and being made from a porous substrate; an electrolyte-retaining matrix provided between the electrodes; and a pair of separator plates for partitioning the cells at the outer ends; one electrode, in which a gas is formed by reaction of the reacting gases to thereby generate electricity, among the pair of electrodes, having a catalyst layer; and an independent gas inflow passage closed at one end and an independent gas outflow passage closed at one end, the independent gas inflow and gas outflow passages being located such that the reacting gas supplied from the gas inflow passage passes through the one electrode and the catalyst layer toward the gas outflow passage, passing through the catalyst layer of the one electrode toward the gas outflow passage accompanied with the gas formed by the reaction of the reacting gas.

2. A fuel cell according to claim 1, wherein the inflow passage and the outflow passage are provided each in a plurality and alternately on one side of the electrode.

3. A fuel cell according to claim 1, wherein the inflow passage and the outflow passage are provided each in a plurality and on both sides of the electrode, respectively.

4. A fuel cell according to claim 1, wherein the inflow passage is provided on the separator plate adjacent to the electrode, and the outflow passage is provided on the electrode at the side that faces the matrix.

5. A fuel cell according to claim 1, wherein the reacting gas passes through from one side to the other side of the electrode.

6. A fuel cell according to claim 1, wherein the inflow and outflow passages are located such that the reacting gas passes through the electrode in the cocurrent direction with the gas formed by the reaction.

7. A fuel cell according to claim 1, wherein the catalyst layer is provided on the outflow passage.

8. A fuel cell according to claim 1, wherein the catalyst layer is provided on the inflow passage and the outflow passage.

9. A fuel cell according to claim 1, wherein the catalyst layer is uniformly distributed throughout the electrode.

10. A fuel cell according to claim 1, wherein the passage is in a form of channels, grooves, holes, or continued pores.

11. A fuel cell according to claim 1, wherein the fuel cell is an acid electrolyte-type fuel cell.

12. A fuel cell according to claim 11, wherein said one electrode is the electrode for the oxidizing agent.

13. A fuel cell according to claim 1, wherein the fuel cell is an alkaline electrolyte-type fuel cell.

14. A fuel cell according to claim 13, wherein said one electrode is the hydrogen electrode.

15. A fuel cell according to claim 1, wherein said catalyst layer is wetted with electrolyte.

16. A fuel cell according to claim 1, wherein the inflow and outflow passages are provided in the same direction.

17. A fuel cell according to claim 16, wherein the inflow and outflow passages are provided in the same direction by providing the inflow passage with an open and a closed end, and by providing the outflow passage with open and closed ends opposite to that of the inflow passage.

18. A fuel cell according to claim 1, wherein the inflow gas passage includes means for forced diffusion of the reacting gas supplied from the gas inflow passage.

* * * * *